US012290901B2

(12) United States Patent
Tamura et al.

(10) Patent No.: US 12,290,901 B2
(45) Date of Patent: May 6, 2025

(54) IMPACT TOOL

(71) Applicant: Koki Holdings Co., Ltd., Tokyo (JP)

(72) Inventors: Kengo Tamura, Ibaraki (JP); Junichi Toukairin, Ibaraki (JP); Shota Takeuchi, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 0 days.

(21) Appl. No.: 17/927,747

(22) PCT Filed: Apr. 23, 2021

(86) PCT No.: PCT/JP2021/016543

§ 371 (c)(1),
(2) Date: Nov. 25, 2022

(87) PCT Pub. No.: WO2021/241099

PCT Pub. Date: Dec. 2, 2021

(65) Prior Publication Data

US 2023/0202004 A1 Jun. 29, 2023

(30) Foreign Application Priority Data

May 29, 2020 (JP) ................................ 2020-094019

(51) Int. Cl.
*B25B 21/02* (2006.01)

(52) U.S. Cl.
CPC .................................... *B25B 21/02* (2013.01)

(58) Field of Classification Search
CPC .... B25D 11/064; B25D 11/06; B25D 17/245; B25D 17/24; B25B 21/02; B25B 21/023;
(Continued)

(56) References Cited

U.S. PATENT DOCUMENTS 10,213,912 B2 * 2/2019 Kumagai ............... B25D 17/26
11,192,223 B2 * 12/2021 Kumagai ................ B25B 19/00
(Continued)

FOREIGN PATENT DOCUMENTS

CN 101543984 9/2009
EP 3162505 5/2017
(Continued)

OTHER PUBLICATIONS

"Search Report of Europe Counterpart Application", issued on Nov. 17, 2023, pp. 1-8.
(Continued)

*Primary Examiner* — Dariush Seif
(74) *Attorney, Agent, or Firm* — JCIPRNET

(57) ABSTRACT

An impact tool includes a hammer that is rotated by a motor and energized toward a front side from a spindle by a cam mechanism and a spring, and an anvil that is struck by the hammer. The hammer includes a main body part, and claw parts extending forward from the main body part, and tapered surfaces are formed such that an inner diameter side end of each of the claw parts of the main body part is located on the front side relative to an outer diameter side end of the claw part. The tapered surfaces are formed, on an outer peripheral side of a front facing surface of the hammer, in such a shape that the tapered surfaces recede as separating in a radial direction from a rotation axis.

13 Claims, 10 Drawing Sheets

(58) Field of Classification Search
CPC ....... B25B 21/026; B25B 19/00; B25B 23/16; H01F 7/1615; H01F 2007/1692; H02K 33/12; H02K 35/00; H02K 35/02
USPC ................ 173/114, 117, 202, 212, 128, 1, 2
See application file for complete search history.

(56) References Cited

U.S. PATENT DOCUMENTS

| | | | | |
|---|---|---|---|---|
| 11,858,094 | B2 * | 1/2024 | Kawai | B25B 21/02 |
| 11,980,948 | B2 * | 5/2024 | Tamura | B23Q 3/12 |
| 2006/0180327 | A1 * | 8/2006 | Nagasaka | B25B 21/02<br>173/128 |
| 2009/0014193 | A1 * | 1/2009 | Barezzani | B25B 21/026<br>173/93 |
| 2010/0186978 | A1 * | 7/2010 | Sekino | B25F 5/001<br>173/48 |
| 2014/0367132 | A1 * | 12/2014 | Tanaka | B25B 21/02<br>173/93 |
| 2015/0041169 | A1 * | 2/2015 | Kumagai | B25D 17/26<br>173/93.7 |
| 2016/0129568 | A1 * | 5/2016 | Nishikawa | B25B 21/026<br>173/93 |
| 2017/0036327 | A1 * | 2/2017 | Murakami | B25F 5/006 |
| 2017/0144278 | A1 * | 5/2017 | Nishikawa | B25B 21/026 |
| 2017/0259412 | A1 * | 9/2017 | Nishikawa | B25B 21/026 |
| 2018/0117745 | A1 * | 5/2018 | Murakami | B25D 11/04 |
| 2018/0272510 | A1 * | 9/2018 | Muramatsu | B25B 21/026 |
| 2018/0297179 | A1 * | 10/2018 | Osada | B25B 21/008 |
| 2019/0262978 | A1 * | 8/2019 | Tejima | B25B 21/026 |
| 2021/0086333 | A1 * | 3/2021 | Murakami | B25B 23/1475 |
| 2021/0187717 | A1 * | 6/2021 | McClung | B25B 21/02 |

FOREIGN PATENT DOCUMENTS

| | | |
|---|---|---|
| JP | 2005254374 | 9/2005 |
| JP | 2008535675 | 9/2008 |
| WO | 2011010497 | 1/2011 |
| WO | 2011046029 | 4/2011 |
| WO | 2016002539 | 1/2016 |

OTHER PUBLICATIONS

"Office Action of Japan Counterpart Application", issued on Dec. 5, 2023, with English translation thereof, pp. 1-12.
"International Search Report (Form PCT/ISA/210) of PCT/JP2021/016543," mailed on Jul. 20, 2021, with English translation thereof, pp. 1-4.
"Office Action of China Counterpart Application", with English translation thereof, issued on Feb. 22, 2025, pp. 1-12.

* cited by examiner (A)

(B)

(A)

(B)

Position of striking surface
36a of hammer claw 36
when no striking occurs d : Displacement amount until contact is made on inner diameter side of hammer claw
α : Angular displacement in shape in which present invention is applied
β : Angular displacement in conventional shape

IMPACT TOOL

CROSS-REFERENCE TO RELATED APPLICATION

This application is a 371 application of the International PCT application serial no. PCT/JP2021/016543, filed on Apr. 23, 2021, which claims the priority benefits of Japan Patent Application No. 2020-094019, filed on May 29, 2020. The entirety of each of the above-mentioned patent applications is hereby incorporated by reference herein and made a part of this specification.

TECHNICAL FIELD

The present invention relates to an impact tool for fastening a fastener such as a screw or a bolt.

RELATED ART

As a striking tool for fastening a screw or the like, there has been known an impact tool in which a rotational striking mechanism is driven by a motor to rotate and strike an anvil, thereby intermittently transmitting a rotational striking force to a tip tool and performing an operation such as screw fastening. The impact tool includes the motor, a power transmission mechanism connected to the motor, and the tip tool connected to the power transmission mechanism. By an operator connecting the tip tool to a fastener such as a screw and rotating the motor, the impact tool fastens the fastener with impact. As such an impact tool, a technique of Patent Document 1 has been known. In Patent Document 1, as a power transmission mechanism, a striking mechanism is provided that converts a rotational force into a striking force in a rotation direction. In the striking mechanism, an anvil that outputs the rotational force to the tip tool and a collision part (claw part) of a hammer that imparts the striking force to the anvil are each provided in three places.

PRIOR-ART DOCUMENTS

Patent Documents

Patent Document 1: WO 2016/002539

SUMMARY OF THE INVENTION

Problems to be Solved by the Invention

With the recent increase in the output of the impact tool, a power source such as a battery pack has been strengthened and motor performance has been improved. As a result, there is an increasing fear that a mechanical component such as the striking mechanism may be unable to withstand the output of the motor and may be damaged, and a good countermeasure is thus necessary. As the countermeasure against damage to the mechanical component, it is conceivable to change the material and shape of the hammer or the anvil or the like. For example, in the past there were two sets of a hammer claw and an anvil blade. In the technique of Patent Document 1, the number of sets has been increased to three. By increasing the number of sets of hammer claws and anvil blades to three, contact at the time of striking is distributed in three places in a circumferential direction, and a force applied to each place of contact can therefore be reduced. However, on the other hand, in the case where all these places of contact are not able to undergo collision at the same time (for example, if contact occurs in two instead of three places at the same time, and occurs in the remaining one place after a slight delay), an extremely large stress occurs in the vicinity of an outer diameter side end of a root of a hammer claw. Countermeasures such as providing a groove having a large radius of curvature R at the root of the hammer claw or chamfering an end of the hammer claw have been taken. However, these countermeasures result in an increase in an overall length of a product or an increase in the number of processing steps in part processing.

The present invention has been made in view of the above background, and an object thereof is to provide an impact tool in which a stress generated in a joint between a main body part of a hammer and a striking claw is reduced. Another object of the present invention is to provide an impact tool with a reduced overall length and improved workability.

Means for Solving the Problems

Representative features of the invention disclosed herein will be described as follows. According to one feature of the present invention, an impact tool includes: a motor; a spindle, driven in a rotation direction by the motor; a hammer, relatively movable in an axial direction and a rotation direction within a predetermined range with respect to the spindle and energized forward by a cam mechanism and a spring; and an anvil, rotatably provided in front of the hammer and struck by the hammer when the hammer rotates while moving forward. In the impact tool, the hammer is configured to include a main body part and a claw part extending forward from the main body part, and a front inner diameter side end of the main body part is configured to be located in front of a front outer diameter side end of the main body part. The main body part of the hammer includes a front wall, and the claw part has a shape protruding from the front wall toward the anvil as viewed in a rotation axis direction. At this time, a relationship between a length L1 of an inner diameter side front end of the claw part from the main body part and a length L2 of an outer diameter side front end of the claw part from the main body part is configured to satisfy L1<L2.

According to another feature of the present invention, the main body part of the hammer is formed with a tapered surface that gradually recedes away from a rotation axis. By configuring a portion or the whole of the claw part to protrude from the tapered surface toward the anvil in this way, the relationship of L1<L2 can be realized. A groove having a predetermined radius of curvature is formed in a connection corner on both circumferential sides of the main body part and the claw part of the hammer.

According to yet another feature of the present invention, an orthogonal plane orthogonal to the rotation axis is configured to be formed in the main body part of the hammer, and an axial length D1 of the hammer from the orthogonal plane to a rear end is configured to be greater than an axial length D2 of the hammer from the tapered surface to the rear end. By providing the tapered surface on an outer peripheral side of a front side surface of the hammer excluding the claw part, a configuration satisfying D1>D2 is realized.

According to yet another feature of the present invention, a spring support for supporting the spring is configured to be formed on a side of the main body part of the hammer opposite the anvil, and the tapered surface is configured to extend from radially outside of a radial center position of the spring support. The cam mechanism is configured to include a spindle cam groove provided on the spindle, a hammer cam groove formed on an inner peripheral side of the hammer, a cam ball disposed between the spindle cam groove and the hammer cam groove, and a spring having a coil shape that is disposed around the spindle and energizes the hammer toward the anvil in a rotation axis direction. The motor of the impact tool is driven using a battery that is able to be used in a detachable electric tool as a driving power source.

Effects of the Invention

According to the impact tool of the present invention, stress concentration in the vicinity of an outer diameter side end of a root of a hammer claw can be reduced. A striking mechanism can be made compact.

Figure 7:
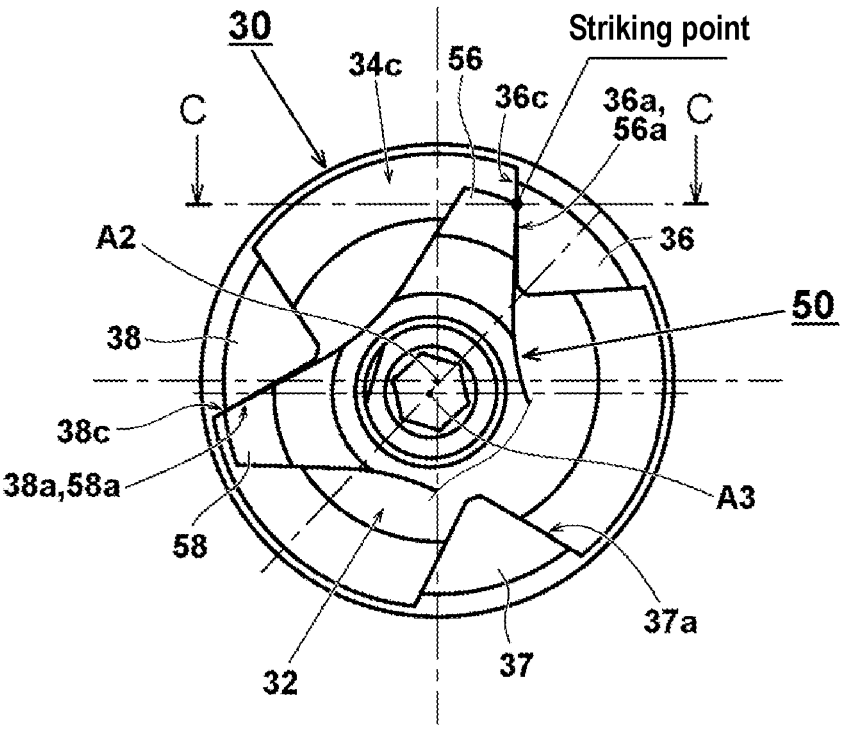
Figure 7:
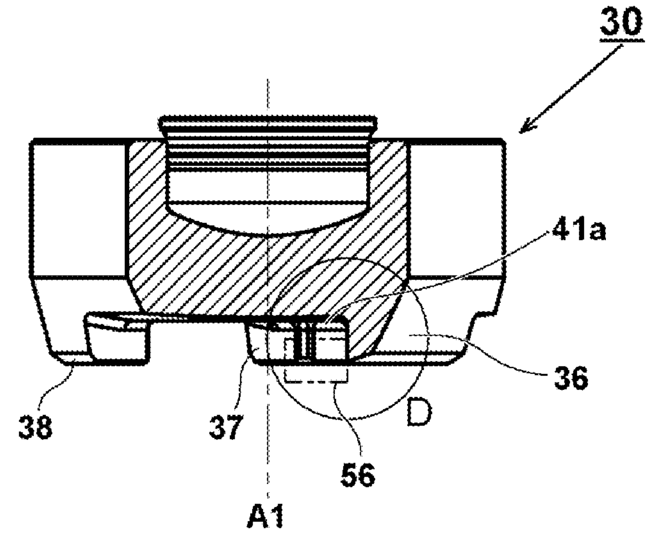

(A) of FIG. 7 is a front view showing a striking state when the hammer 30 and the anvil 50 are misaligned, and (B) of FIG. 7 is a sectional view of section C-C and a view in a direction of the rotation axis A1 from section C-C.

Figure 8:
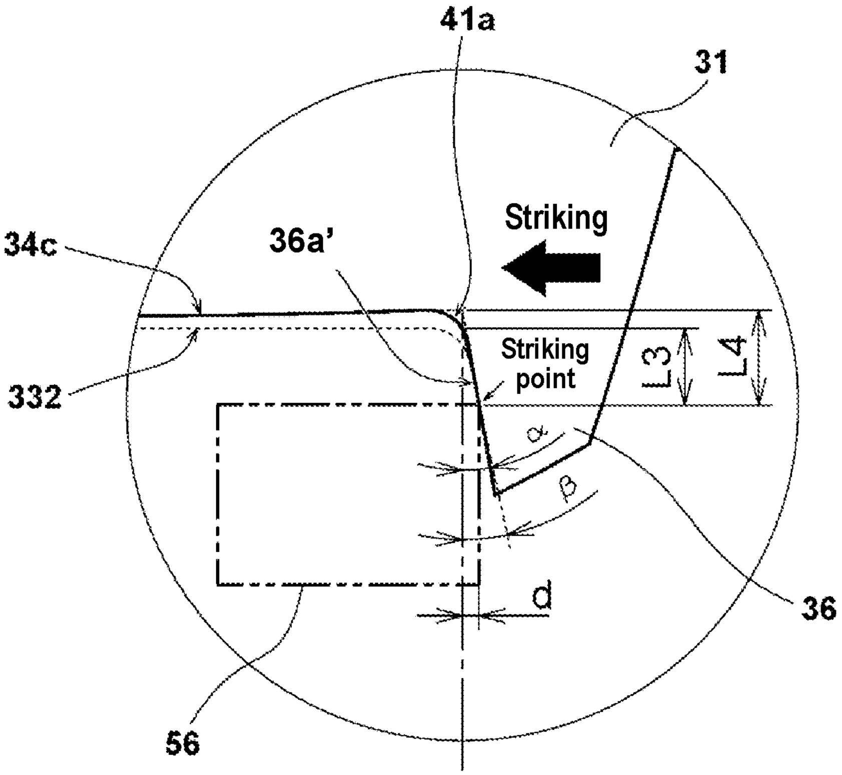

FIG. 8 is a partially enlarged view of part D of (B) of FIG. 7.

Figure 9:
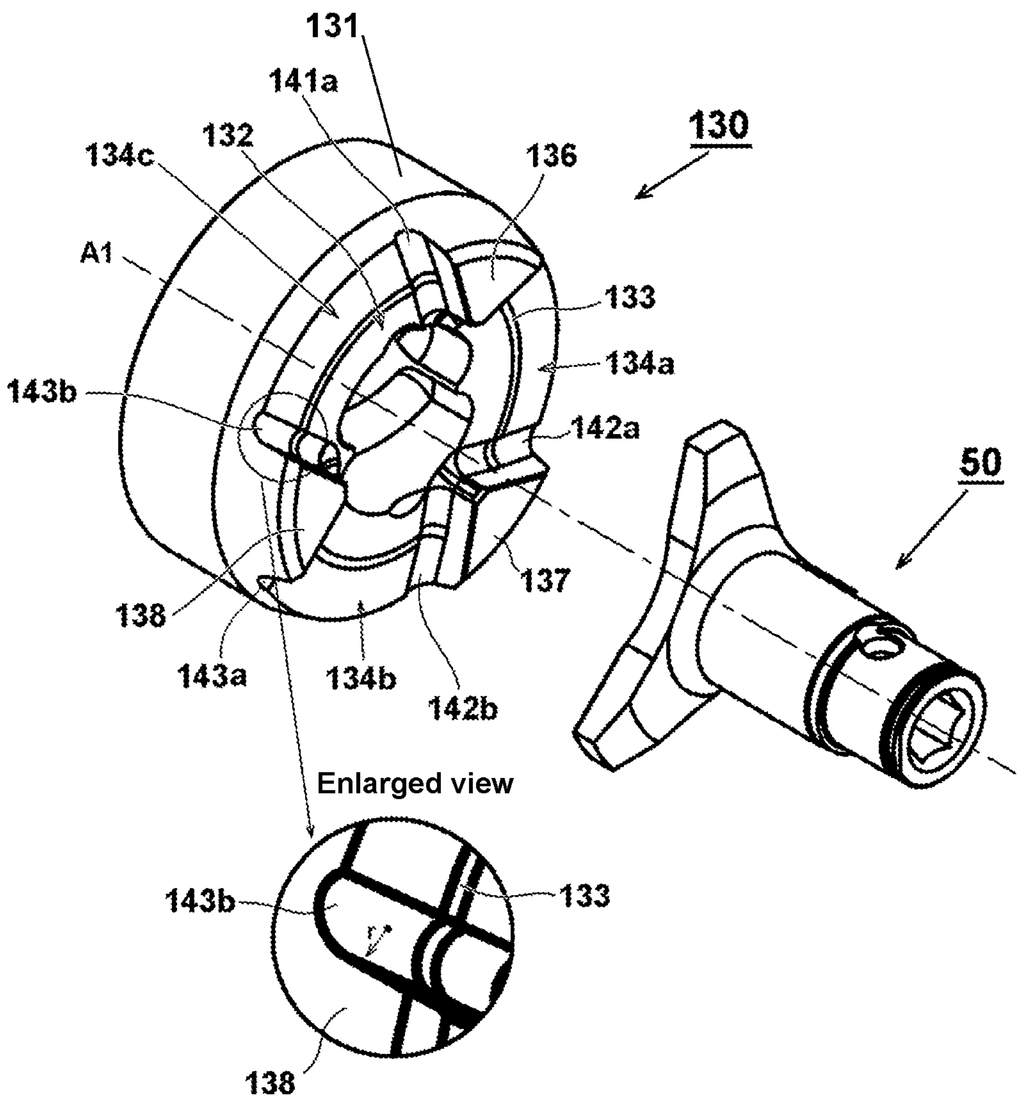

FIG. 9 is a perspective view of a hammer 130 and an anvil 150 according to a second embodiment of the present invention.

Figure 10:
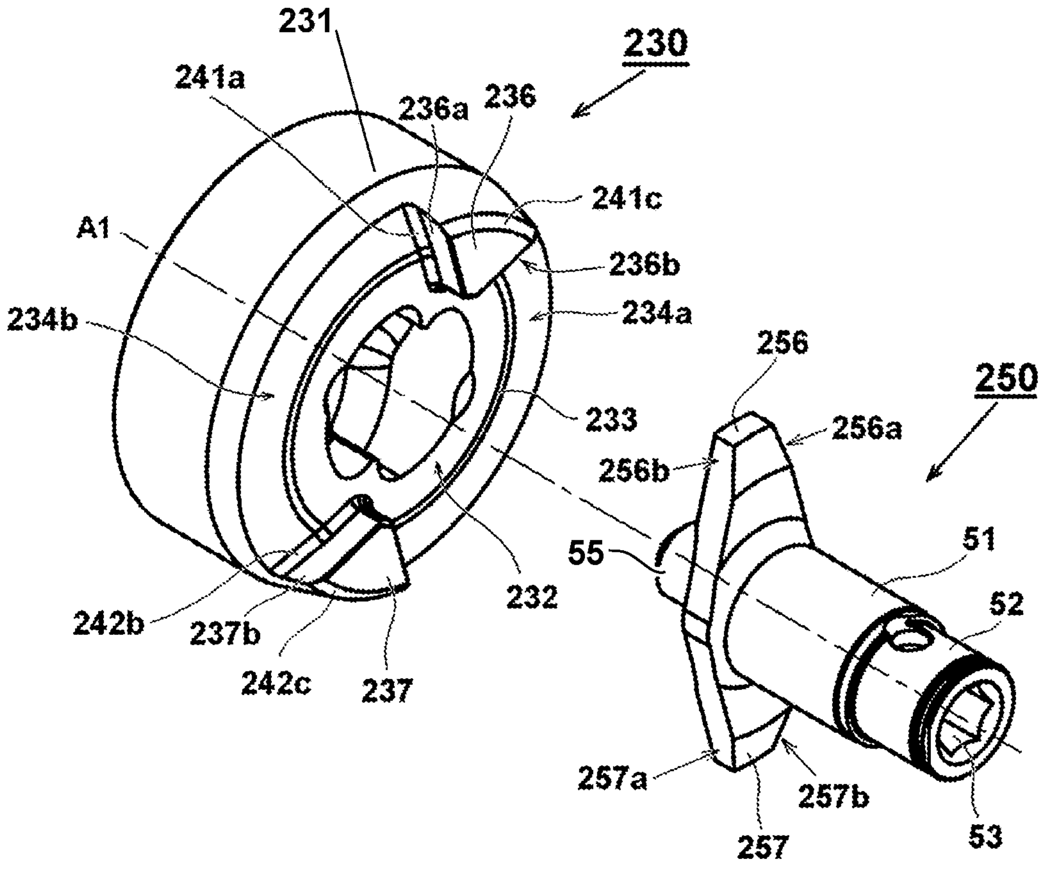

FIG. 10 is a perspective view of a hammer 230 and an anvil 250 according to a third embodiment of the present invention.

DESCRIPTION OF THE EMBODIMENTS

Embodiment 1

Hereinafter, an embodiment of the present invention is described based on the drawings. In the following description, the front-rear, left-right, and up-down directions are described as the directions shown in the drawings.

Figure 1:
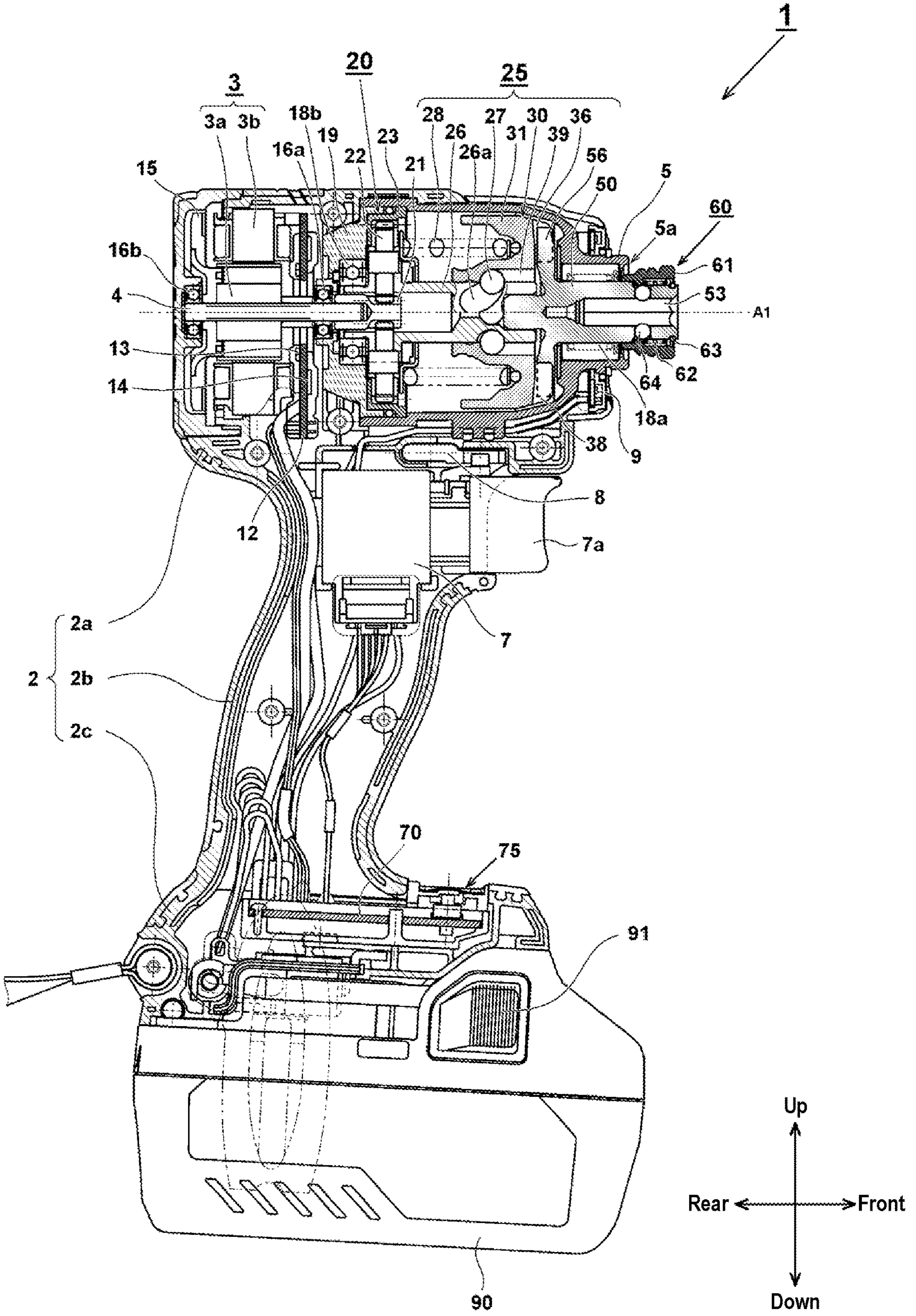
FIG. 1 is a longitudinal sectional view showing an overall structure of an impact tool 1 of the present embodiment.

FIG. 1 is a side view showing an appearance of an impact tool 1 according to an embodiment of the present invention. In the impact tool 1, a battery 90 of a rechargeable pack type is used as a power source, a rotational force and a striking force are imparted to an output shaft (anvil 50) with a motor as a driving source, a rotational striking force is intermittently transmitted to a tip tool (not shown) such as a driver bit held in a mounting hole 53 by a mounting mechanism 60, and an operation such as screw fastening or bolt fastening is performed. A housing 2 of the impact tool 1 is formed in a substantially T-shape, including a tubular body 2*a* and a handle 2*b*, the body 2*a* having a substantially cylindrical shape for housing a motor and a power transmission mechanism, the handle 2*b* extending from the vicinity of a substantial center of the body 2*a* in a direction substantially orthogonal to a rotation axis A1 and being provided for an operator to grip with one hand. Among ends of the handle 2*b*, a lower end (end on a side opposite the body) located on a side opposite the body 2*a* has a battery attachment part 2*c* formed thereat. A trigger lever 7*a* is disposed in an upper part inside the handle 2*b* so as to protrude forward. A forward/reverse switching lever 8 for switching a rotation direction of a motor 3 between the forward direction and the reverse direction is provided on a rear side of the trigger lever 7*a*.

The motor 3 is housed on the rear side of the tubular body 2*a*. The motor 3 is a DC (direct current) motor without a brush (rectifying brush), and is a 4-pole, 6-slot brushless DC motor. The motor 3 includes a rotor 3*a* including a permanent magnet and a stator 3*b* including a multi-phase armature winding (stator winding) such as a three-phase winding. The rotor 3*a* forms a magnetic path formed by the permanent magnet. The stator 3*b* is manufactured of a laminated structure of annular thin iron plates, and has six teeth (not shown) formed on the inner peripheral side thereof. An enameled wire is wound around each tooth to form a coil. In the present embodiment, the coil has a star connection or delta connection having three phases, namely, U phase, V phase, and W phase. The motor 3 is operated in the following manner. That is, a DC voltage supplied from a battery or the like is switched by a plurality of semiconductor switching elements 14 using an output of a position detector 13 composed of a plurality of Hall ICs that detect a magnetic force of the permanent magnet of the rotor 3*a* and detect a rotor position. Although the motor is a brushless motor in the present embodiment, the motor may also be a brushed motor.

A rotation shaft 4 of the motor 3 is disposed concentrically with the rotation axis A1 of the tubular body 2*a*, and axially supported by the housing 2 by two bearings 16*a* and 16*b* on the front side and the rear side. A substantially annular inverter circuit board 12 for mounting three position detectors 13 and six semiconductor switching elements 14 or the like is disposed on the rear side of the stator 3*b*. The inverter circuit board 12 is a substantially annular double-sided board having approximately the same diameter as an outer diameter of the motor 3. Six semiconductor switching elements 14 are provided to form an inverter circuit and switch energization to the stator winding of each phase. As the semiconductor switching element 14, a field-effect transistor (FET), an insulated gate bipolar transistor (IGBT) or the like may be used. Since the inverter circuit is controlled by a microcomputer and an energization timing of the armature winding of each phase is set based on a position detection signal for the rotor 3*a* by the position detector 13, advanced rotation control becomes easy.

A cooling fan 15 is attached coaxially with the rotation shaft 4 between the rotor 3*a* and the bearing 16*b*. The cooling fan 15 is, for example, integrally molded by a plastic mold, sucks air from an air intake (not shown) formed in the vicinity of both left and right sides of the inverter circuit board 12 of the body 2*a*, and discharges the air rearward in the direction of the rotation axis A1 so that the air flows inside and around the motor 3. Cooling air that has passed through the inverter circuit board 12 cools the motor 3 located on the rear side of the inverter circuit board 12, and is discharged to the outside through an air discharge slit (not shown) formed on a side of the cooling fan 15.

A hammer case 5 formed in a cup shape is provided on the front side of the housing 2. The hammer case 5 houses a decelerator 20 and an impact mechanism (striking mechanism) 25 therein and is provided on the front side of the body 2*a* of the housing 2. The hammer case 5 is made of an integral piece of metal, in which a through hole 5*a* for the anvil 50 to penetrate therethrough is formed in a front portion corresponding to a bottom of the cup shape. A mounting mechanism 60 for enabling mounting or removal of the tip tool (not shown) is provided at a tip portion of the anvil 50 outside the hammer case 5.

The mounting mechanism 60 is configured to include a mounting hole 53 having a hexagonal sectional shape and extending axially rearward from a front end of the anvil 50, two holes penetrating in a radial direction and formed in two places in a circumferential direction for disposing a steel ball 64, and a sleeve 61 provided on an outer peripheral side. A spring 62 that energizes the sleeve 61 rearward is mounted inside the sleeve 61. An illumination device 9 for irradiating the vicinity of a tip of the tip tool (not shown) is provided on a lower side of the mounting mechanism 60. One or a plurality of light-emitting diodes (LEDs) are used as the illumination device 9, and an irradiation window through which light is transmitted is provided on the front side of the illumination device 9.

The trigger lever 7*a* is disposed so as to protrude forward in the upper part inside the handle 2*b* extending integrally at a substantially right angle from the body 2*a* of the housing 2, and a trigger switch 7 is provided behind the trigger lever 7*a*. By gripping the handle 2*b* with one hand and pulling the trigger lever 7*a* rearward with the index finger or the like, a user is able to adjust a trigger pushing amount (operation amount) and adjust a rotation speed of the motor 3. A rotation direction of the motor 3 can be switched by operating the forward/reverse switching lever 8.

The battery attachment part 2*c* expanding in a direction substantially orthogonal to an axis direction of the handle 2*b* is provided in a lower part inside the handle 2*b*. The battery 90 serving as a driving power source for the motor 3 is detachably mounted on the battery attachment part 2*c*. To remove the battery 90, the battery 90 is relatively moved forward from a main body part of the impact tool 1 while a latch 91 is pressed. A control circuit board 70 for controlling the inverter circuit board 12 of the motor 3 is provided in an upper part of the battery 90. The control circuit board 70 is disposed horizontally so as to extend in the front-rear and left-right directions, and is equipped with a microcomputer (not shown) that controls rotation of the motor 3. The control circuit board 70 is connected to the inverter circuit board 12 via a signal line. In the vicinity of the control circuit board 70, a switch panel 75 for disposing a remaining capacity check switch and an LED display device for displaying the remaining capacity of the battery 90 and a lighting switch of the illumination device 9 is provided on an upper surface of the battery attachment part 2*c*.

The body 2*a* of the housing 2 is manufactured by integral molding of a synthetic resin material together with the handle 2*b* and the battery attachment part 2*c*, and is formed so that it can be divided into two in the left-right direction by a vertical plane passing through the rotation shaft 4 of the motor 3. At the time of assembly, the following method is employed. That is, members on the left side and members on the right side of the housing 2 are prepared. The hammer case 5 having the decelerator 20 and the impact mechanism 25 incorporated therein and the motor 3 and the like are incorporated into the housing 2 on one side (for example, the housing on the left side) as shown in the sectional view of FIG. 1 in advance. Thereafter, the housing 2 on one side is overlapped with the housing 2 on the other side (for example, the housing on the right side) and is fastened with a plurality of screws.

The impact mechanism 25 is provided on an output side of the decelerator 20 composed of a planetary gear, includes a spindle 26 and a hammer 30, and is rotatably held by the bearing 18*b* at a rear end and by the bearing 18*a* at a front end. The decelerator 20 is configured to include a sun gear 21 fixed to a tip of the rotation shaft 4 of the motor 3, a ring gear 23 provided on an outer peripheral side of the sun gear 21 so as to surround the sun gear 21 with a distance therebetween, and a plurality of planetary gears 22 disposed in a space between the sun gear 21 and the ring gear 23 and meshed with both gears. The ring gear 23 is also called an outer gear, in which a gear is formed on an inner peripheral surface of a ring-shaped member. An outer peripheral surface of the ring gear 23 is held by the housing 2, and the ring gear 23 itself does not rotate.

The sun gear 21 is a spur gear serving as an input part of the decelerator 20. A plurality of (here, three) planetary gears 22 are disposed between an outer gear surface of the sun gear 21 and an inner gear surface of the ring gear 23. The three planetary gears 22 are axially supported by a planetary carrier formed at a rear end of the spindle 26, and the planetary gears 22 revolve around the sun gear 21 while rotating around a shaft (not shown) axially supported by the planetary carrier. When the rotation shaft 4 of the motor 3 rotates, the sun gear 21 also rotates synchronously therewith. A rotational force of the sun gear 21 is decelerated at a predetermined rate and the spindle 26 rotates.

An inner cover 19 is a part manufactured by integral molding of synthetic resin, and is held by the body 2*a* of the housing 2 so as to be sandwiched from the left and right. At this time, the inner cover 19 is held so as not to relatively rotate with respect to the housing 2. Since one of a plurality of screw bosses provided is located in an upper part of the inner cover 19, the inner cover 19 is stably sandwiched by the housing 2. The inner cover 19 mainly serves to hold the two bearings 18*b* and two bearings 16*a* provided and center the rotation shaft 4 of the motor 3 and a rotation center of the spindle 26 on the same axis. The bearing 16*a* held by the inner cover 19 is for axially supporting the rotation shaft 4 of the motor 3, and a ball bearing, for example, may be used. The bearing 18*b* held by the inner cover 19 is for axially supporting the rear end of the spindle 26, and a ball bearing, for example, may be used.

The decelerator 20 and the impact mechanism 25 constitute a power transmission mechanism for driving the tip tool by the motor 3. When the trigger lever 7*a* is pulled and the motor 3 is activated, the motor 3 starts to rotate in a direction set by the forward/reverse switching lever 8 and a rotational force thereof is decelerated by the decelerator 20 and transmitted to the spindle 26, and the spindle 26 rotates at a predetermined speed. Here, the spindle 26 and the hammer 30 are connected by a cam mechanism. This cam mechanism is composed of a V-shaped spindle cam groove 26*a* formed on an outer peripheral surface of the spindle 26, a hammer cam groove 39 formed on an inner peripheral surface of the hammer 30, and two steel balls 27 engaging with the spindle cam groove 26*a* and the hammer cam groove 39. The hammer 30 is always energized forward by a hammer spring 28. In three places on rotation planes of the hammer 30 and the anvil 50 that face each other, hammer claws (striking claws) 36 to 38 (37 is not visible in the drawing) protruding convexly in the direction of the rotation axis A1 and blades (struck claws) 56 to 58 (only 56 is visible in the drawing) to be struck by the striking claws are formed rotationally symmetrical.

When the spindle 26 is rotationally driven, rotation thereof is transmitted to the hammer 30 via the cam mechanism, and the striking claw of the hammer 30 engages with the struck claw of the anvil 50 to rotate the anvil 50 before the hammer 30 makes a half rotation. When relative rotation occurs between the spindle 26 and the hammer 30 due to an engagement reaction force between the hammer 30 and the anvil 50 during rotation, the hammer 30 starts to recede toward the motor 3 side while compressing the hammer spring 28 along the spindle cam groove 26*a* of the cam mechanism. When the striking claw of the hammer 30 rides across the struck claw of the anvil 50 due to the receding movement of the hammer 30 and the engagement between the two is released, while rapidly accelerated in a rotation direction and forward by elastic energy accumulated in the hammer spring 28 and the action of the cam mechanism in addition to a rotational force of the spindle 26, the hammer 30 is moved forward by an energization force of the hammer spring 28, and the striking claw (such as 36) of the hammer 30 engages again with the struck claw (such as 56) of the anvil 50 and they start to rotate together. When the hammer 30 makes one relative rotation with respect to the anvil 50, the number of striking (simultaneous striking) becomes 3 (low speed striking) or 1.5 (high speed striking). Since a strong rotational striking force is applied to the anvil 50 in this way, the rotational striking force is transmitted to the tip tool (not shown) mounted in the mounting hole 53 integrally formed with the anvil 50. Afterward, the same operation is repeated, the rotational striking force is intermittently and repeatedly transmitted to the tip tool, and a wood screw, for example, is screwed into a fastened member (not shown) such as a piece of wood.

Figure 2:
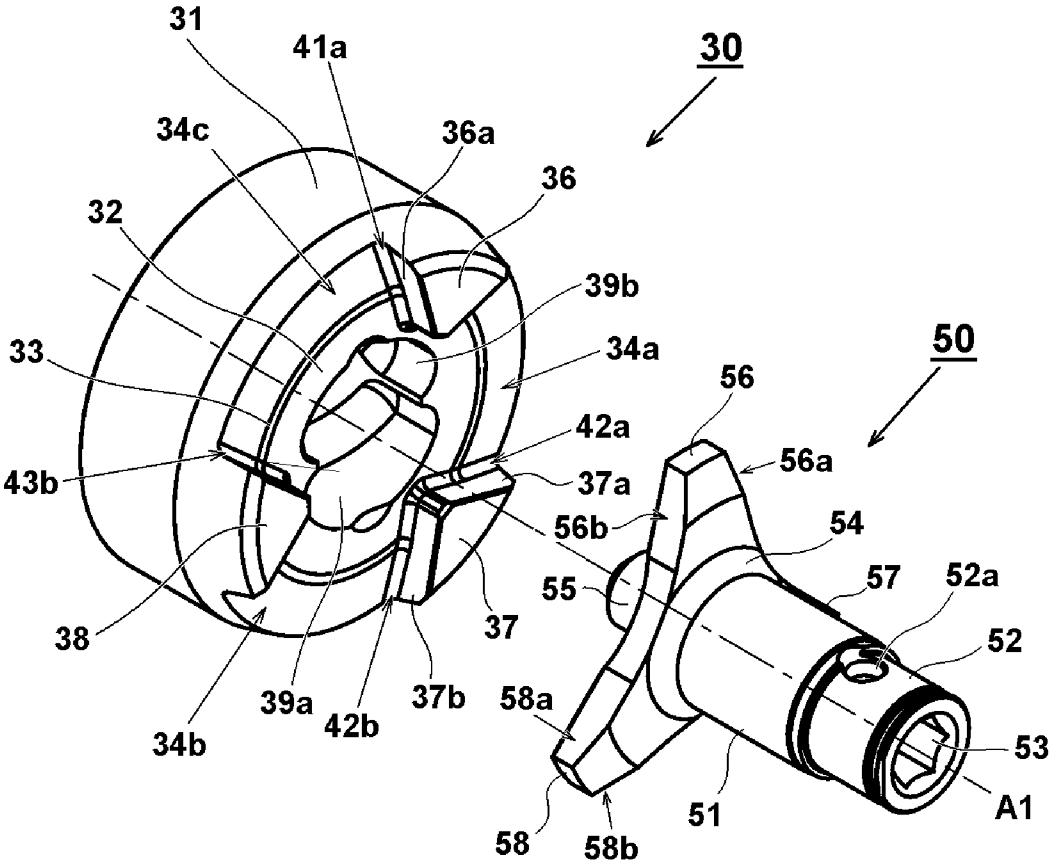
FIG. 2 is a perspective view of a hammer 30 and an anvil 50 of FIG. 1.

FIG. 2 is a perspective view of the hammer 30 and the anvil 50 according to the present embodiment. The hammer 30 is disposed between the decelerator 20 and the anvil 50 in the direction along the rotation axis A1. The hammer 30 is configured to be relatively rotatable with respect to the spindle 26 (see FIG. 1) and relatively movable in the direction along the rotation axis A1. Hammer cam grooves 39*a* and 39*b* are formed radially inside the hammer 30. The steel ball 27 (see FIG. 1) is disposed inside the hammer cam grooves 39*a* and 39*b*. Since the hammer 30 is held on the spindle 26 (see FIG. 1) via the steel ball 27 (see FIG. 1), the hammer 30 is movable in the direction along the rotation axis A1 within a range in which the steel ball 27 is rollable, and the hammer 30 is relatively rotatable with respect to the spindle 26 within a predetermined range in a circumferential direction about the rotation axis A1 as a central axis within the range in which the steel ball 27 is rollable.

When a load in a rotation direction of the anvil 50 increases, the hammer claws 36 to 38 of the hammer 30 and the blades 56 to 58 of the anvil 50 are repeatedly engaged and disengaged, thereby generating a rotational striking force on the anvil 50 serving as the output shaft. Here, the weight of the hammer 30 is set greater than the weight of the anvil 50. The hammer 30 converts the rotational force of the spindle 26 into the rotational force of the anvil 50 or the striking force in the rotation direction.

The hammer 30 is composed of a main body part 31 formed in a substantially cylindrical shape and the hammer claws 36 to 38 extending forward from the main body part 31. In the present specification, a portion of the hammer 30 other than the hammer claws 36 to 38 is defined as the "main body part 31". On the anvil 50 side of the main body part 31, a front facing surface 32 (orthogonal plane) orthogonal to the rotation axis A1 is formed. The front facing surface 32 is a surface adjacent to and facing the anvil 50, and faces with a slight gap with respect to, or contacts, the blades 56 to 58 of the anvil 50 when the hammer 30 is in a normal position (front position within a forward and rearward movement range along the rotation axis A1). The front facing surface 32 is a substantially annular surface orthogonal to the rotation axis A1. Tapered surfaces 34*a* to 34*c* are formed on an outer peripheral side of the front facing surface 32. The tapered surfaces 34*a* to 34*c* are inclined surfaces that are inclined rearward (toward the side opposite the anvil) in the direction of the rotation axis A1 as going from a radially inner peripheral side to the outer peripheral side. In FIG. 2, a joint between an outer peripheral edge of the front facing surface 32 and an inner peripheral edge of the tapered surfaces 34*a* to 34*c* is illustrated as double lines. This is because an area between the double lines is formed as a surface having a small radius of curvature due to the fact that a sectional shape of the joint that includes the rotation axis A1 is chamfered. Whether to set the outer peripheral edge of the front facing surface 32 and the inner peripheral edge of the tapered surfaces 34*a* to 34*c* to be angular, or whether to connect the double lines by a plane, or whether to form a groove recessed inward in a plane direction between the double lines is arbitrary.

The hammer claws 36 to 38 are formed to protrude forward from the main body part 31 and are integrally formed with the main body part 31. Circumferential center positions of the hammer claws 36 to 38 are disposed at intervals (equal intervals) of 120 degrees in the circumferential direction, and the hammer claws 36 to 38 are substantially fan-shaped in section along a direction intersecting the rotation axis A1. A width dimension of the hammer claws 36 to 38 radially outside the hammer 30 and in a direction along the circumferential direction is set to about 10 mm Accordingly, sufficient strength of the hammer claws 36 to 38 is secured, and the hammer claws 36 to 38 adjacent to each other along the circumferential direction of the hammer 30 allow the blades 56 to 58 of the anvil 50 to easily enter therebetween. A central angle portion of the substantially fan shape is located on a side close to the rotation axis A1, and a circular arc portion is located in approximately the same position as or slightly inside an outer edge of the main body part 31 of the hammer 30. A circular arc portion of the sectional shape of the hammer claws 36 to 38 may be in a shape whose diameter is the same or slightly decreases from the rear toward the front in the direction of the rotation axis A1. In the present embodiment, an outer peripheral surface of each of the hammer claws 36 to 38 has a shape in which an outer diameter on a tip side is slightly reduced so that the diameter of the outer peripheral surface slightly decreases toward the front. A front end face of each of the hammer claws 36 to 38 is chamfered so as to be orthogonal to the rotation axis A1. That is, the front end face of the hammer claws 36 to 38 is a surface parallel to the front facing surface 32.

The tapered surfaces 34*a* to 34*c* are disposed so as to be circumferentially interrupted by the three hammer claws 36 to 38 as viewed in the circumferential direction. An innermost peripheral position of each of the tapered surfaces 34*a* to 34*c* is disposed between a radially innermost position and a radially outermost position of the substantially fan-shaped hammer claws 36 to 38. By setting a boundary position 33 between the tapered surfaces 34*a* to 34*c* and the front facing surface 32, a protrusion amount (size indicated by L1 in FIG. 3 described later) of the hammer claws 36 to 38 toward the front along the rotation axis A1 with respect to the main body part 31 in an innermost peripheral position and a protrusion amount (size indicated by L2 in FIG. 3 described later) in an outermost peripheral position can be formed different from each other.

The anvil 50 is manufactured by integral molding of metal, and has the three blades 56 to 58 formed protruding radially outward from an annular flange 54 on the rear side of a main shaft 51. The main shaft 51 is a portion axially supported by the bearing 18*a* (see FIG. 1) using a needle bearing, and serves as a rolling surface of a needle of the bearing 18*a*. On the front side of the main shaft 51, a small diameter part 52 is formed slightly narrow for attaching the mounting mechanism 60 of the tip tool (not shown). The mounting hole 53 for mounting the tip tool that has a hexagonal sectional shape is formed from a tip of the small diameter part 52 rearward in the direction of the rotation axis A1. In the vicinity of a rear end of the small diameter part 52, two through holes 52*a* are formed penetrating in the radial direction, and the steel ball 64 (see FIG. 1) that is a component of the mounting mechanism 60 is disposed. Between the through hole 52*a* and the blades 56 to 58 as viewed in the axial direction is the main shaft 51 whose outer peripheral surface is formed columnar.

The three blades 56 to 58 serving as a struck part are struck claws that are evenly disposed so that their circumferential center positions are separated at intervals of 120° as viewed in the rotation direction, and are disposed so as to extend radially outward. On a side surface of the blades 56 to 58 in the rotation direction, struck surfaces 56*a*, 57*a*, and 58*a* to be struck by a striking claw of the hammer 30 during rotation in a fastening direction and struck surfaces 56*b*, 57*b*, and 58*b* formed on a side opposite the struck surfaces 56*a*, 57*a*, and 58*a* and to be struck during rotation in a loosening direction are formed. A columnar shaft 55 is formed on the rear side of the blades 56 to 58, and an outer peripheral surface of the shaft 55 is axially supported in a slidable state by engaging with a fitting hole (see FIG. 1) of the spindle 26. A width dimension of the blades 56 to 58 radially outside the anvil 50 and in the direction along the circumferential direction is set to about 5 mm That is, the width dimension of the blades 56 to 58 is set slightly shorter than that of the hammer claws 36 to 38. Accordingly, sufficient strength of the blades 56 to 58 is secured, and the blades 56 to 58 adjacent to each other along the circumferential direction of the anvil 50 have a relatively long distance therebetween and allow the hammer claws 36 to 38 of the hammer 30 to easily enter therebetween.

Figure 3:
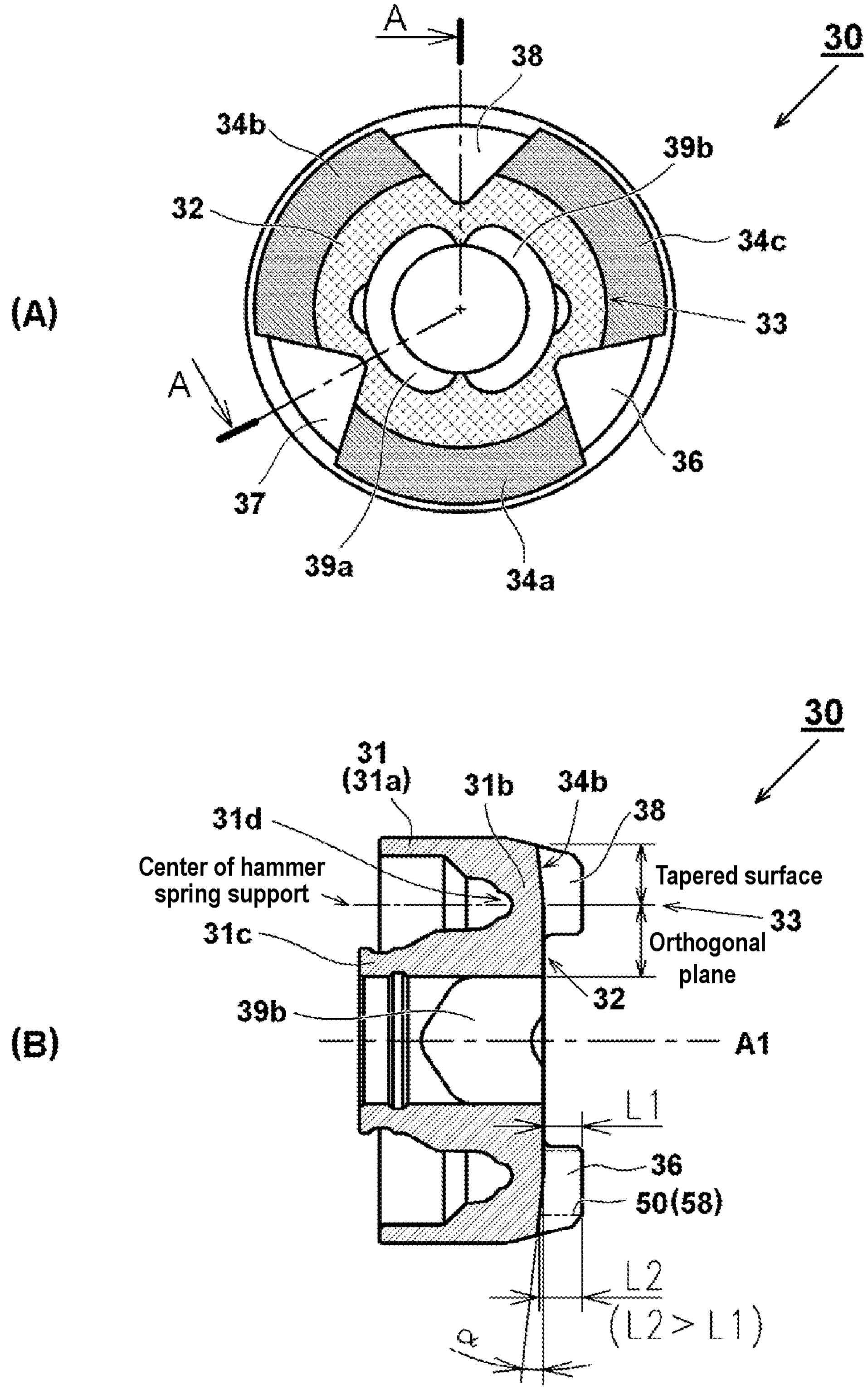
FIG. 3 illustrates the hammer 30 of FIG. 2, in which (A) is a front view and (B) is a longitudinal sectional view.

(A) of FIG. 3 is a front view of the hammer 30, and the longitudinal sectional view of (B) of FIG. 3 is a sectional view of section A-A of (A) of FIG. 3. Since only one of the three hammer claws 36 to 38 is shown in a vertical sectional view in (B) of FIG. 3, (B) of FIG. 3 is taken as a sectional view of section A-A (in FIG. 1 and FIG. 6, the position of the section of the hammer 30 and the anvil 50 is set as a section like section A-A). In (A) of FIG. 3, a front wall surface of the main body part 31 of the hammer 30 is formed by the front facing surface 32 located on the inner peripheral side and the tapered surfaces 34*a*, 34*b*, and 34*c* located on the outer peripheral side. Here, hatching is applied to clarify the range of those areas. The hammer claws 36, 37, and 38 are formed to have a fan shape as viewed from the front. A root (portion connected with the main body part 31) in an innermost peripheral position of the fan shape is within the range of the front facing surface 32, and is an area where the outer peripheral side is joined to the tapered surfaces 34*a*, 34*b*, and 34*c* from the vicinity of the middle of sides on straight lines of the fan shape. That is, the boundary position 33 between the tapered surfaces 34*a*, 34*b*, 34*c* and the front facing surface 32 is preferably configured to be located between an innermost position and an outermost position of the fan-shaped portion of the hammer claws 36, 37 and 38.

In (B) of FIG. 3, the hammer 30 has a double tubular shape composed of an outer tube 31*a* and an inner tube 31*c*, and the outer tube 31*a* and the inner tube 31*c* are connected on the front side thereof by a front surface connection part 31*b*. The front facing surface 32 and the tapered surfaces 34*a* to 34*c* are formed on the front side of the front surface connection part 31*b*. A spring support 31*d* for supporting a front end of a coil-shaped spring on which the hammer spring 28 is held is formed on the rear side of the front surface connection part 31*b*. A center position (frontmost position) of an annular shape of the spring support 31*d* and the boundary position 33 between the tapered surfaces 34*a* to 34*c* and the orthogonal plane (front facing surface 32) have such a positional relationship that their distance from the rotation axis A1 is approximately the same. By forming the hammer 30 as described above, a length of the hammer claws 36, 37, and 38 in the direction of the rotation axis A1 is L1 on the inner peripheral side and L2 on the outer peripheral side, and a relationship of L2>L1 is established. Although a receding angle α of the tapered surfaces 34*a* and 34*b* is set to 6° here, the receding angle α may be appropriately set within a range of about 2° to 20°.

Figure 4:
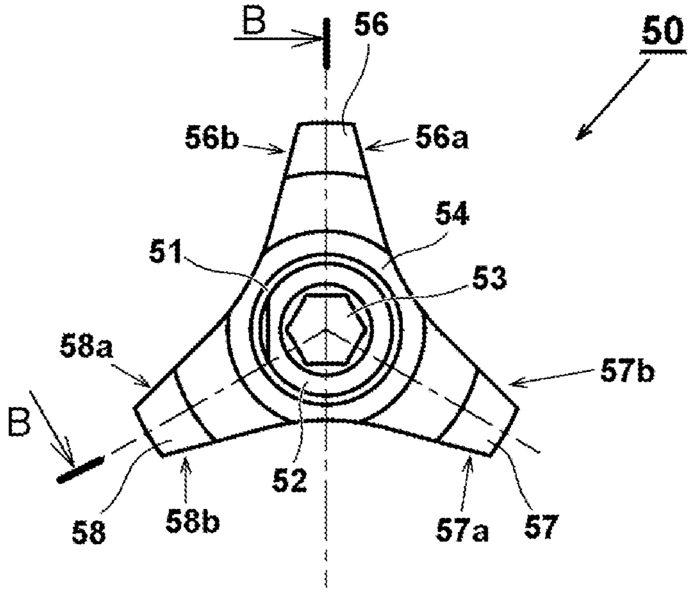
FIG. 4 illustrates the anvil 50 of FIG. 2, in which (A) is a front view and (B) is a longitudinal sectional view.
Figure 4:
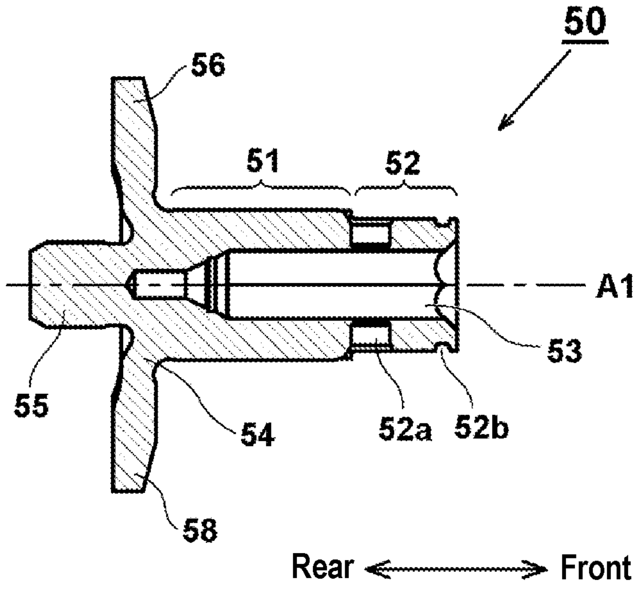

(A) of FIG. 4 is a front view of the anvil 50. The anvil 50 has the same shape as the anvil 50 used in the conventional impact tool. The anvil 50 is attached in a position where the internal between the anvil 50 and the hammer 30 as viewed in the direction of the rotation axis A1 is slightly smaller than that in the conventional impact tool. The anvil 50 has the three blades 56 to 58. The struck surfaces 56*a*, 57*a*, and 58*a* are formed on one side of the blades 56 to 58 in the rotation direction, and the struck surfaces 56*b*, 57*b*, and 58*b* are formed on the other side. However, from a relationship that a strong striking force from the hammer 30 is applied to the anvil 50, by forming the annular flange 54 on the outer peripheral side of the main shaft 51 and rendering the flange 54 and the blades 56 to 58 to be nearly triangular as viewed from the front, strength is improved.

(B) of FIG. 4 is a sectional view of section B-B of (A) of FIG. 4. The mounting hole 53 of the anvil 50 is configured to extend not only to the small diameter part 52 but also to the rear side in the direction of the rotation axis A1 until the inner side of the main shaft 51. By this configuration, it is possible to mount the tip tool (not shown) such as a bit in the axial direction. The through hole 52*a* is a hole penetrating to the outside from the mounting hole 53 inside the small diameter part 52. The through hole 52*a* is formed slightly larger than the steel ball 64 (see FIG. 1), and is formed in the following manner. That is, by forming only the diameter of the through hole 52*a* at the innermost position to be slightly smaller than the steel ball 64, the steel ball 64 inserted from the outer peripheral side of the through hole 52*a* remains on the mounting hole 53 side with a certain amount of protrusion without being able to pass through the inside of the mounting hole 53 on the radially inner side. In the vicinity of the tip of the small diameter part 52 in the direction of the rotation axis A1, a circumferentially continuous circumferential groove 52*b* is formed in order to fix a retaining ring 63 (see FIG. 1) that holds the spring 62 (see FIG. 1). On the rear side of the main shaft 51, the blades 56, 57, and 58 (57 is not visible in the drawing) extending radially outward from the flange 54 are formed, and the columnar shaft 55 is formed on the rear side of the blades 56, 57, and 58. The shaft 55 is formed solid and is axially supported in a slidable state by engaging with the fitting hole (see FIG. 1) of the spindle 26.

Figure 5:
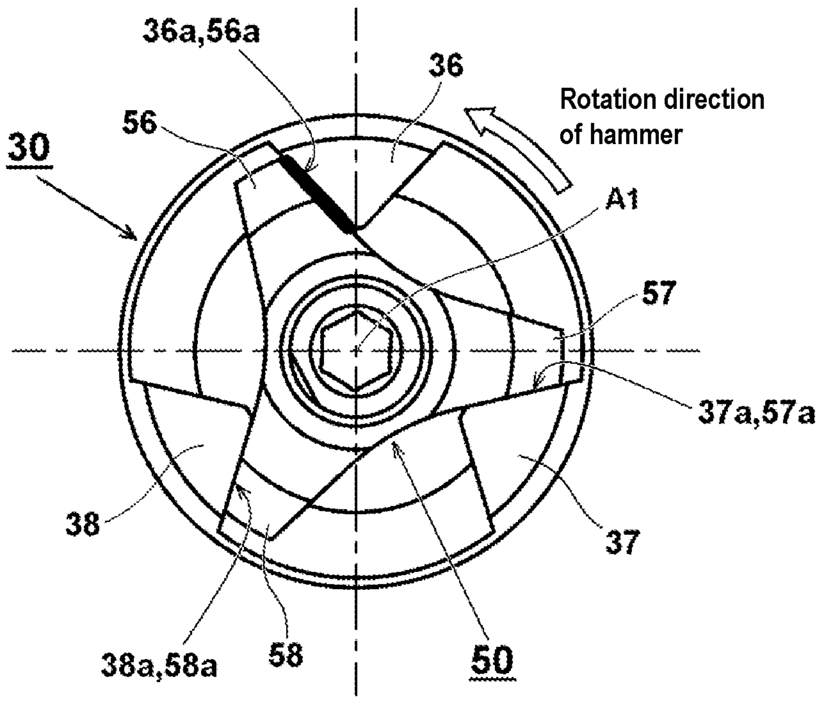
FIG. 5 is a front view showing the hammer 30 and the anvil 50 of FIG. 1 in a normal striking state.

FIG. 5 is a front view showing the hammer 30 and the anvil 50 in a normal striking state. A rotation center of each of the hammer 30 and the anvil 50 is coaxial with the rotation axis A1 that normally serves as a rotation center of the motor 3. In this coaxial state, a striking surface 36*a* of the hammer claw 36 and the struck surface 56*a* of the anvil 50 are in good surface contact over substantially the entire surface as shown by a portion indicated by a thick black line. Similarly, a striking surface 37*a* of the hammer claw 37 and the struck surface 57*a* of the anvil 50 are in good surface contact over substantially the entire surface, and a striking surface 38*a* of the hammer claw 38 and the struck surface 58*a* of the anvil 50 are in good surface contact over substantially the entire surface. Since the surface contact occurs at the same time in these three places when the hammer 30 rotates during normal rotation, a striking force rotationally symmetrical with respect to the rotation axis A1 is transmitted from the hammer 30 to the anvil 50.

Figure 6:
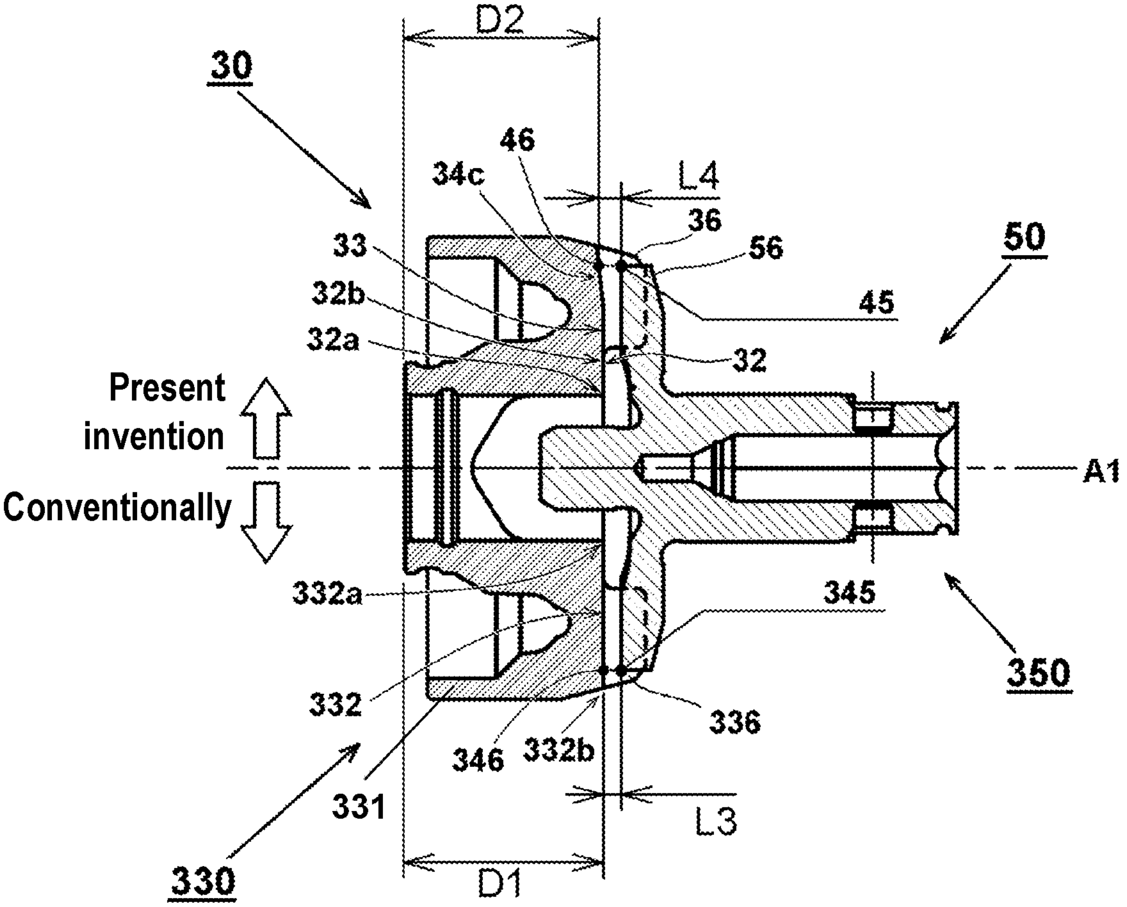
FIG. 6 illustrates a longitudinal section for comparing the hammer 30 and the anvil 50 of the present embodiment and a conventional hammer 330 and a conventional anvil 350 in terms of shape, in which the upper half above a rotation axis A1 shows the shape of the present embodiment, and the lower half shows the conventional shape.

FIG. 6 illustrates a longitudinal section for comparing the hammer 30 and the anvil 50 in terms of shape, in which the upper half above the rotation axis A1 illustrates the shape of the hammer 30 and the anvil 50 of the present invention, and the lower half illustrates the shape of a conventional hammer 330 and a conventional anvil 350. In the drawing below the rotation axis A1, in the conventional hammer 330, an outer wall surface (front facing surface 332) on the front side of a main body part 331 is a surface perpendicular to the rotation axis A1, is a flat surface from a radially inner position 332*a* to a radially outer position 332*b* of the front facing surface 332, and is in the same position in the direction of the rotation axis A1. On the other hand, in the hammer 30 of the present embodiment, a flat surface 32*b* (orthogonal plane) orthogonal to the rotation axis A1 is defined from a radially inner position 32*a* to the boundary position 33, and the tapered surfaces 34*a* to 34*c* (portion of 34*c* is visible in the drawing) are defined on the outer peripheral side from the boundary position 33. Since the boundary position 33 is located inside an outermost diameter portion of the anvil 50, the outermost diameter portion of the anvil 50 is located to face the tapered surfaces 34*a* to 34*c*. As a result, a distance between a striking point 45 of the hammer claw 36 of the present embodiment and the main body part 31 (root position 46) of the hammer 30 is L4 as indicated in the drawing. On the other hand, in the conventional hammer 330, a distance between a striking point 345 of a hammer claw 336 and the main body part 331 (root position 346) of the hammer 330 is L3 as indicated in the drawing, and a relationship of L4>L3 is established. By setting L4>L3 in this way, the hammer claws 36 to 38 become more likely to deform as approaching an outer diameter side end. Even if the hammer claws 36 to 38 and the blades 56 to 58 of the anvil 50 locally contact at the outer diameter side end, since a contact part of the hammer claws 36 to 38 expands toward an inner diameter side before occurrence of a large stress in the vicinity of a root of the contact part, a difference due to a position of a load borne by the vicinity of the root is reduced. As a result, stress concentration in a specific portion (the vicinity of the outer diameter side end of a claw root) that occurs when the hammer claws 36 to 38 make partial contact is reduced.

In the present embodiment, since the flat surface 32*b* (orthogonal plane) and the tapered surfaces 34*a* to 34*c* are provided on the front side of the main body part 31 of the hammer 30, an axial length D1 from the flat surface 32*b* (orthogonal plane) of the hammer 30 to a rear end can be configured to be greater than an axial length D2 from the tapered surfaces 34*a* to 34*c* of the hammer 30 to the rear end. The tapered surfaces 34*a* to 34*c* are formed on the outer peripheral side of the front wall surface of the main body part 31 of the hammer 30. The tapered surfaces 34*a* to 34*c* may be formed in a curved shape, a circular arc shape, or a polygonal shape instead of a sectional shape as in FIG. 6 that is a linear shape.

(A) of FIG. 7 is a front view showing a striking state when the hammer 30 and the anvil 50 are misaligned. During the normal rotation shown in FIG. 5 (when the rotation centers of the hammer 30 and the anvil 50 match), striking occurs at the same time between the striking surface 36*a* and the struck surface 56*a*, between the striking surface 37*a* and the struck surface 57*a* (not shown), and between the striking surface 38*a* and the struck surface 58*a*. However, when the rotation center of the hammer 30 deviates from a rotation center A3 of the anvil 50 like A2, point contact (or line contact) instead of surface contact may occur at the initial striking point between the hammer 30 and the anvil 50. Moreover, the timing of striking may not be the same in the three places. (A) of FIG. 7 illustrates the deviation between the rotation centers A2 and A3 to be extremely large for describing the state. It should be noted that some of the blades of the anvil 50 have been omitted.

(A) of FIG. 7 shows an example in which the initial striking point becomes a specific place (striking point shown in the drawing) in the hammer claw 36 and the blade 56 due to deviation of the rotation center A2 of the hammer 30. Not only the position of the rotation center A2 of the hammer 30 deviates with respect to the rotation axis A1, but the rotation center A3 of the anvil 50 may deviate in an opposite direction with respect to the rotation axis A1. When the rotation centers A2 and A3 deviate in opposite directions in this way, a state as in (A) of FIG. 7 is achieved (the deviation is greatly exaggerated for convenience of description). At this time, while striking has occurred between the hammer claw 36 and the blade 56 and between the hammer claw 38 and the blade 58, striking has not occurred between the hammer claw 37 and the blade 57 (not shown). When the rotation center A2 of the hammer 30 deviates, the initial striking point is located inside an outermost position 36*c* of the hammer claw 36. In contrast, in the hammer claw 38, a striking point to the blade 58 is in the vicinity of an outermost position 38*c*. (B) of FIG. 7 shows a section of section C-C in this state.

(B) of FIG. 7 is a sectional view of section C-C and a view in the direction of the rotation axis A1 from section C-C. Here, the position of the blade 56 of the anvil 50 is indicated by a two-dot chain line. In this drawing, the hammer claw 36 is in contact with the blade 56 of the anvil 50 on the front side away from a chamfered groove 41*a* formed at the root of the hammer claw 36 in the direction of the rotation axis A1. In a striking operation during use, the root of the hammer claw 36 and the blade 56 of the anvil 50 may become further away from each other in the direction of the rotation axis A1 than in the state of FIG. 1 due to a rotation speed of the spindle 26, a load acting on the tip tool or the like. That is, the striking point (line) shown in (A) of FIG. 7 may occur on the front side as viewed in the direction of the rotation axis A1.

FIG. 8 is an enlarged view of part D of (B) of FIG. 7. When the hammer 30 rotates in a direction of a black arrow while advancing in the direction of the rotation axis A1 after the hammer spring 28 is compressed, a claw (for example, hammer claw 36) of the hammer 30 strikes a blade (for example, blade 56) of the anvil 50. FIG. 8 shows a state immediately after striking. From a normal state (parallel to the rotation axis A1) indicated by a dot-and-dash line, the striking surface 36*a* of the hammer claw 36 is distorted from the position of the dot-and-dash line in a manner as shown by a striking surface 36*a*' indicated by a solid line (although the distortion is illustrated to be extremely large in FIG. 8 for ease of understanding, the actual distortion is very small) by an impact due to collision with the blade 56 of the anvil 50. At this time, in the impact tool 1 of the present embodiment, a distance from the tapered surface 34*c* to a striking point as viewed in the direction of the rotation axis A1 is L4, like the hammer claw 36. The striking point is displaced by d from the position of the striking surface 36*a* when no striking occurs, and the striking surface 36*a*' of the hammer claw 36 is deformed by an angle $\alpha$ at the time of striking. When the striking point is displaced by d, the striking surface 36*a* of the hammer claw 36 and the struck surface 57*a* of the anvil 50 come into contact with each other over substantially the entire surface as shown in FIG. 5. In the conventional hammer 330 as shown in the lower half of FIG. 6, since no tapered surface is formed on the hammer, the position of the front facing surface 332 of the main body part of the hammer is a position indicated by a dotted line in FIG. 8. A distance from the position of the dotted line to the striking point as viewed in the direction of the rotation axis A1 is L3. In this case, a striking surface of the hammer claw 336 is deformed by an angle $\beta$ at the time of striking, and a relationship of $\alpha<\beta$ is established. That is, a stress generated in each of the hammer claws 36 to 38 is reduced in the shape in which the present invention is applied.

As described above, by using the hammer 30 of the present embodiment, even if a hammer claw and an anvil blade locally contact at an outer diameter side end, a contact part of the hammer claw expands toward an inner diameter side before occurrence of a large stress at a root of the contact part, and a difference due to a position of a load borne by the root of the hammer claw can be reduced. As a result, stress concentration in the vicinity of the outer diameter side end of the claw root that occurs when the hammer claw makes partial contact can be reduced, and a striking mechanism having high reliability and excellent durability can be realized.

Embodiment 2

FIG. 9 is a perspective view of a hammer 130 and an anvil 150 according to a second embodiment of the present invention. The hammer 130 is configured to include a main body part 131 and three hammer claws 136 to 138. A flat surface (front facing surface 132) orthogonal to the rotation axis A1 is defined from a radially inner position of the main body part 131 to a boundary position 133, and tapered surfaces 134*a* to 134*c* are defined on the outer peripheral side from the boundary position 133. Six grooves 141*a*, 141*b* (not visible in the drawing), 142*a*, 142*b*, 143*a*, and 143*b* are formed in the hammer 130. These grooves are formed to have a radius of curvature r. By combination with the tapered surfaces 134*a*, 134*b*, and 134*c* of the present embodiment, the radius of curvature r can be made smaller than that of a groove formed in the conventional hammer 330. While exaggerated in FIG. 9 for understanding the description, the radius of curvature r is actually a very small radius of about 1 mm. By making the radius of curvature r of the grooves 141*a*, 141*b* (not visible in the drawing), 142*a*, 142*b*, 143*a*, and 143*b* smaller than a radius of curvature r1 (not shown) in a hammer with a conventional groove formed therein, an interval (gap corresponding to L3 of FIG. 6) between the hammer 130 and the anvil 150 in the direction of the rotation axis A1 can be made smaller than conventionally. In the case of a large radius of curvature r1 as conventionally, since a contact portion between the hammer 130 and the anvil 150 overlaps the groove portion, a length of a hammer claw of the hammer 330 in the direction of the rotation axis A1 is configured to be long, and an interval between the hammer 330 and the anvil 350 is widened. In the impact tool 1 of the present embodiment, since the interval between the hammer 130 and the anvil 150 is made smaller than conventionally, the size of the impact tool 1 can be made smaller than conventionally.

Embodiment 3

FIG. 10 is a perspective view of a hammer 230 and an anvil 250 according to a third embodiment of the present invention. In the first embodiment and the second embodiment described above, an example has been given where the number of hammer claws and blades is three. However, the present invention can be similarly realized by an impact tool in which the number of hammer claws of the hammer 230 is two and the number of blades of the anvil 250 is two, as in FIG. 10. The hammer 230 is configured to include a main body part 231 and two hammer claws 236 and 237. A flat surface (front facing surface 232) orthogonal to the rotation axis A1 is defined from a radially inner position of the main body part 231 to a boundary position 233, and tapered surfaces 234*a* and 234*b* are defined on the outer peripheral side from the boundary position 233. In the hammer 230, the two hammer claws 236 and 237 are disposed 180° apart in the circumferential direction. The hammer claw 236 is substantially fan-shaped in section orthogonal to the rotation axis A1, and has a striking surface 236*a* during forward rotation and a striking surface 236*b* during reverse rotation formed on a side surface in the circumferential direction. In the vicinity of a joint between the main body part 231 and the striking surface 236*a* of the hammer 230, joints 241*a* and 241*b* (241*b* is not visible in the drawing) formed by gently curved surfaces are formed. In the vicinity of a joint between the main body part 231 and the striking surface 236*b*, a joint 242*b* formed by a gently curved surface is formed. Chamfering 241*c* is applied to a corner between an outer peripheral surface and a front surface of the hammer claw 236, and chamfering 242*c* is applied to a corner between an outer peripheral surface and a front surface of the hammer claw 237.

In the anvil 250, two blades 256 and 257 are disposed 180° apart in the circumferential direction. The main shaft 51, the small diameter part 52, the mounting hole 53 and the shaft 55 of the anvil 250 have the same shape as those of the anvil 50 of the first embodiment. The shape of an outer half of the blades 256 and 257 as viewed in the radial direction is the same as an outer shape of the blades 56 to 58 of the anvil 50 shown in the first embodiment. A struck surface 256*a* during forward rotation and a struck surface 256*b* during reverse rotation are formed on a side surface of the blade 256. A struck surface 257*a* during forward rotation and a struck surface 257*b* during reverse rotation are formed on a side surface of the blade 257. As described above, the present invention can also be applied to an impact tool in which the number of hammer claws and blades is two.

The present invention has been described above based on the embodiments. However, the present invention is not limited to the above embodiments, and various modifications can be made without departing from the spirit of the present invention. For example, the shape of a hammer claw of a hammer or the shape of a blade of an anvil is not limited to the above examples, and the hammer claw and the blade may be realized in other shapes. In that case, an outer peripheral portion of a surface located on a front side of a main body part of the hammer may be formed to be tapered, and the hammer claw may be configured to have different lengths in the rotation axis direction on the inner peripheral side and on the outer peripheral side. A tapered surface may not be formed as a plane, and may be formed as a circular arc surface having an outwardly convex shape, or may have a polyhedral shape.

What is claimed is:

1. An impact tool comprising:
a motor;
a spindle, driven about a rotation axis in a rotation direction by the motor;
a hammer, relatively movable in a rotation axial direction and a rotation direction within a predetermined range with respect to the spindle and energized forward by a cam mechanism and a spring; and
an anvil, rotatably provided in front of the hammer and struck by the hammer when the hammer rotates while moving forward, wherein
the hammer comprises a main body part formed in a substantially cylindrical shape having a front wall, and a plurality of claw parts each of the plurality of claw parts extending forward from the front wall of the main body part and having a striking surface configured to contact a struck surface of the anvil when the hammer rotates,
wherein a plurality of tapered surfaces are formed on the front wall, the plurality of tapered surfaces being tapered rearward going away from the rotation axis, and each striking surface of the plurality of claw parts being joined to one of the plurality of tapered surfaces,
wherein a relationship between a length L1 of an inner diameter side front end of the striking surface of the plurality of claw parts from the front wall of the main body part and a length L2 of an outer diameter side front end of the striking surface of the plurality of claw parts from the plurality of tapered surfaces of the main body part satisfies L1<L2.

2. The impact tool according to claim 1, wherein
a portion or the whole of the plurality of claw parts is configured to protrude from the plurality of tapered surfaces toward the anvil, thereby satisfying L1<L2.

3. The impact tool according to claim 1, wherein
a groove having a predetermined radius of curvature is formed in a connection corner on both circumferential sides of the front wall of the main body part and the plurality of claw parts.

4. The impact tool according to claim 1, wherein
an orthogonal plane orthogonal to the rotation axis is formed in the front wall of the main body part, and an axial length D1 of the hammer from the orthogonal plane to a rear end of the hammer is greater than an axial length D2 of the hammer from the plurality of tapered surfaces to the rear end of the hammer.

5. The impact tool according to claim 4, wherein
D1>D2 is satisfied by providing the plurality of tapered surfaces on an outer peripheral side of the front wall.

6. The impact tool according to claim 5, wherein
a spring support for supporting the spring is formed on a side of the main body part of the hammer opposite the anvil;
the plurality of tapered surfaces is provided radially outside of a radial center position of the spring support.

7. The impact tool according to claim 1, wherein
the cam mechanism comprises a spindle cam groove provided on the spindle, a hammer cam groove formed on an inner peripheral side of the hammer, a cam ball disposed between the spindle cam groove and the hammer cam groove, and the spring having a coil shape that is disposed around the spindle and energizes the hammer toward the anvil in a rotation axis direction.

8. The impact tool according to claim 1, further comprising:
a housing, housing the motor; and
a battery, detachable from the housing, wherein
the motor is driven using the battery as a driving power source.

9. The impact tool according to claim 1, wherein
an outermost diameter part of the anvil is located in a position facing the plurality of tapered surfaces.

10. An impact tool comprising:
a motor;
a spindle, driven about a rotation axis in a rotation direction by the motor;
a hammer, relatively movable in an axial direction and a rotation direction within a predetermined range with respect to the spindle and energized forward by a cam mechanism and a spring; and
an anvil, rotatably provided in front of the hammer and struck by the hammer when the hammer rotates while moving forward, wherein
the hammer comprises a main body part formed in a substantially cylindrical shape having a front wall provided on a front surface of the main body part, and a plurality of claw parts, each of the plurality of claw parts extending forward from the front wall of the main body part and having a striking surface configured to contact a struck surface of the anvil when the hammer rotates,
wherein a plurality of tapered surfaces are formed on the front wall, the plurality of tapered surfaces being tapered rearward going away from the rotation axis, and each of the striking surface of the plurality of claw parts being joined to one of the plurality of tapered surfaces,
a portion or the whole of the plurality of claw parts is configured to protrude from the plurality of tapered surfaces toward the anvil.

11. The impact tool according to claim 10, wherein
a relationship between a length L1 of an inner diameter side front end of the striking surface of the plurality of claw parts from the front wall of the main body part and a length L2 of an outer diameter side front end of the striking surface of the plurality of claw parts from the plurality of tapered surfaces of the main body part satisfies L1<L2.

12. The impact tool according to claim 10, wherein
a groove having a predetermined radius of curvature is formed in a connection corner on both circumferential sides of the front wall of the main body part and the plurality of claw parts.

13. The impact tool according to claim 10, wherein
an orthogonal plane orthogonal to the rotation axis is formed in the front wall of the main body part, and an axial length D1 of the hammer from the orthogonal plane to a rear end of the hammer is greater than an axial length D2 of the hammer from the plurality of tapered surfaces to the rear end of the hammer.

* * * * *